3,019,260
PROCESS FOR THE CATALYTIC REDUCTION OF
6-HYDROXY HYDRONAPHTHACENES
Jerry Robert Daniel McCormick, New City, and Elmer Raymond Jensen, Nanuet, N.Y., assignors to American Cyanamid Company, New York, N.Y., a corporation of Maine
No Drawing. Filed May 13, 1959, Ser. No. 812,790
8 Claims. (Cl. 260—559)

This invention relates to an improved process for the hydrogenolysis of 6-hydroxy hydronaphthacenes and more particularly is concerned with the hydrogenolysis of compounds having the tetracycline nucleus.

In copending application, Serial No. 751,180, filed July 28, 1958, there is described a new family of broad-spectrum antibiotics which are termed 6-deoxytetracyclines. These new compounds may be represented by the following structural formula:

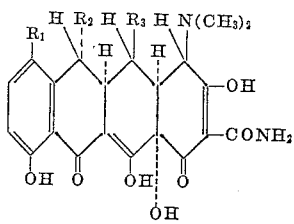

wherein $R_1$ is hydrogen, bromine or chlorine, $R_2$ is hydrogen or methyl, and $R_3$ is hydrogen or hydroxy.

Compounds falling within the above general formula include 6-deoxytetracycline, 6-deoxy-4-epi-tetracycline, 5-hydroxy-6-deoxytetracycline, 5-hydroxy-6-deoxy-4-epi-tetracycline, 6-demethyl-6-deoxytetracycline, 6-demethyl-6-deoxy-4-epi-tetracycline, 7-chloro-6-deoxytetracycline, 7 - chloro - 6 - deoxy-4-epi-tetracycline, 7-bromo-6-deoxytetracycline, 7-bromo-6-deoxy-4-epi-tetracycline, 7-chloro-6-demethyl-6-deoxytetracycline, 7-chloro-6-demethyl-6-deoxy-4-epi-tetracycline, 7-bromo-6-demethyl-6-deoxytetracycline and 7-bromo-6-demethyl-6-deoxy-4-epi-tetracycline. These constitute the 6-deoxy derivatives of all of the known tetracycline antibiotics. The new 6-deoxytetracyclines are biologically active possessing appreciable activity against a variety of gram-positive and gram-negative microorganisms. The new compounds have the typical broad-spectrum anti-bacterial activity of tetracycline which is most surprising considering that the new compounds lack a hydroxyl group in the 6-position of the tetracycline nucleus and some of them, in addition, also lack a methyl group.

As described in the aforesaid copending application, the new compounds are produced by the hydrogenolysis of the corresponding tetracycline that is, the 6-hydroxyl group of compounds having the tetracycline nucleus is replaced by a hydrogen atom. This reaction is carried out by reacting a compound having the tetracycline nucleus with hydrogen in the presence of metallic palladium or other metal of the platinum family. It is an essential feature of this process that the hydrogenolysis reaction must be carried out in the presence of a complexing agent, such as boric acid, boron trifluoride, etc., which serves to prevent that hydrogenation of the oxygen functions at the 11-position and 12-position of the tetracycline ring system. If the 11- or 12-positions of the tetracycline nucleus are hydrogenated in preference to the 6-position, and which invariably occurs in the normal hydrogenation reaction, the resulting compound possesses no biological activity. The use of the chelating agents, however, serves to tie up these two oxygen functions and prevents their hydrogenation so that the desired antibacterial activity of the resulting compounds is retained.

In accordance with the present invention, we have now discovered that if rhodium is employed as a catalyst, either as finely-divided metallic rhodium or suspended on a suitable carrier such as activated charcoal, alumina, etc., surprisingly no complexing or chelating agent is required to tie up the oxygen functions at the 11- and 12-positions and the desired hydrogenolysis of the 6-hydroxy group proceeds smoothly resulting in good yields of the corresponding 6-deoxytetracycline. The process of this invention thereby affords a considerable advantage over the process of the copending application in that since no complexing agents are necessary, when using the new catalysts of this invention, a troublesome purification problem is eliminated and good yields of pure products are obtained. In the process of the copending application it has been found that it is exceedingly difficult to remove residual quantities of these complexing agents by ordinary extraction and purification procedures. As indicated, the extraction and purification problem is eliminated by the use of the new catalyst of this invention. Moreover, the use of rhodium offers a further advantage over the metallic palladium used heretofore in that by the use of the new catalyst a wide pH range may be employed in the described hydrogenolysis reaction.

The more detailed description of this invention which follows will be principally concerned with the hydrogenolysis of compounds having the tetracycline nucleus. However, it is to be understood that this is for purposes of illustration only as the described hydrogenolysis reaction can be applied with equal facility to other 6-hydroxy hydronaphthacenes as well, such as, for example, compounds of the formula:

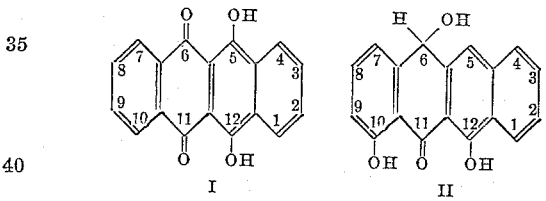

and all such similar compounds are considered to be within the scope of the process of the present specification and claims.

Compound I is reduced with hydrogen to compound III:

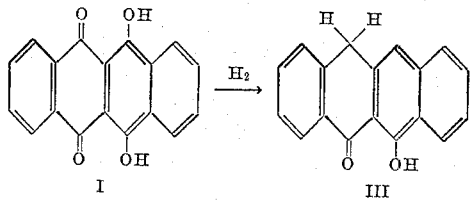

It is to be noted that carbons 5 and 6 in I are tautomerically equivalent and that removal at both the 5-oxygen and 6-oxygen can be considered 6-hydroxyl hydrogenolysis according to this new invention.

The new hydrogenolysis reaction of this invention may be carried out by contacting a solvent solution of the corresponding tetracycline compound with hydrogen in the presence of finely-divided rhodium as the catalyst. As indicated previously, the pure metal may be used, or more preferably, the catalyst is suspended on one of the common carriers, such as finely-divided alumina, activated charcoal, diatomaceous earth, etc. The hydrogenolysis may be carried out at temperatures ranging from about 0° C. to about 100° C. and preferably from about room temperature, that is around 25° C., to about 50° C. and a hydrogen pressures of from 1 to 140 atmospheres.

Suitable inert solvents which may be used in the reaction are various polar solvents such as water, dioxane, glacial acetic acid, 2-methoxyethanol, 2-ethoxy-ethanol, ethyl acetate, etc. A one-to-one ratio of water and dimethylformamide has been found to be a particularly good solvent mixture for this reaction.

A concentration of catalyst of at least 5% by weight of the corresponding tetracycline is necessary and up to about 400% by weight may be used. The hydrogenolysis is usually carried out until one mole of hydrogen has been absorbed, when tetracycline is the starting material, at which time the rate of absorption tends to diminish. When chlortetracycline or bromtetracycline are used, 2-moles of hydrogen are, of course, required to form 6-deoxytetracycline. When only one mole of hydrogen is taken up 7-chloro-6-deoxytetracycline or 7-bromo-6-deoxytetracycline are formed. Some caution must be exercised in not continuing the hydrogenolysis for an undue length of time as further and undesirable reductions may taken place with the production of less desirable products.

After the hydrogenolysis has been completed, the 6-deoxytetracycline compound so-formed is recovered by any desired means, as by removal of the catalyst and concentration of the solution. The product is evaporated to dryness, purified by fractional precipitation in methanol, and may be further purified by recrystallization in alcohol in a standard manner. The neutral product so formed may be converted to a mineral acid salt, i.e., the hydrochloride, by treatment with acids such as hydrochloric acid at a pH of less than about 4. Other acid salts such as the sulfate, phosphate, trichloroacetate, oxalate, citrate, gluconate, etc. may be formed in a similar manner. Preferably, the 6-deoxytetracycline is suspended in a suitable solvent during the acidification.

The invention will be described in greater detail in conjunction with the following specific examples.

EXAMPLE 1

A 0.5 gram portion of tetracycline hydrochloride is dissolved in 10 milliliters of acetic acid. To this solution, 2.0 grams of 5% rhodium on aluminum oxide (alumina) is added. The resulting mixture is contacted with an excess of hydrogen at a pressure of 30 pounds per square inch for three hours and then filtered. Spectrophotometric and paper chromatographic analyses show the presence of 6-deoxytetracycline in the filtrate.

EXAMPLE 2

A 0.5 gram portion of 7-chlorotetracycline neutral is dissolved in 12 milliliters of a 1:1 mixture of dimethylformamide and water. The pH is adjusted to 9.0–9.5 with triethylamine. To this solution is added 1.0 gram of 5% rhodium on aluminum oxide (alumina). The resulting mixture is contacted with an excess of hydrogen at a pressure of 30 pounds per square inch for one hour and then filtered. The pH of the filtrate is adjusted to about 3.0 with hydrochloric acid. Spectrophotometric and paper chromatographic analyses show the presence of 6-deoxytetracycline in the filtrate.

EXAMPLE 3

A 0.5 gram portion of tetracycline hydro-chloride is dissolved in 12 milliliters of a 1:1 mixture of dimethylformamide and water. To this solution is added 2.0 grams of 5% rhodium on carbon. The resulting mixture is contacted with an excess of hydrogen at a pressure of 30 pounds per square inch for 16 hours and then filtered. Spectrophotometric and paper chromatographic analyses show the presence of 6-deoxytetracycline in the filtrate.

EXAMPLE 4

A 0.5 gram portion of tetracycline hydrochloride is dissolved in 12 milliliters of a 1:1 mixture of dimethylformamide and water. To this solution is added 1.0 gram of 5% rhodium on carbon. The resulting mixture is contacted with an excess of hydrogen at a pressure of 30 pounds per square inch for 16½ hours and then filtered. Spectrophotometric assay of this filtrate shows a 35% yield of 6-deoxytetracycline hydrochloride. The filtrate is evaporated to semi-dryness and then redissolved in 10 milliliters of distilled water and freeze-dried. The product is dissolved in 4 milliliters of methyl alcohol, concentrated to a 0.5 milliliter volume, a few drops of concentrated hydrochloric acid added, and seeded to initiate crystal formation. The 6-deoxytetracycline hydrochloride crystals weigh 50 milligrams and assay 985 mcg./mg. spectrophotometrically.

EXAMPLE 5

A 5.18 milligram portion of 7-chloro-6-demethyltetracycline hydrochloride [J.A.C.S. 79, 4561 (1957)] is dissolved in 4 milliliters of a 1:1 mixture of dimethylformamide and water. To this solution is added 10.54 milligrams of 5% rhodium on carbon. The resulting mixture is contacted with an excess of hydrogen for 5½ hours and then filtered. Spectrophotometric and paper chromatographic analyses show the presence of 6-demethyl-6-deoxytetracyline in the filtrate.

EXAMPLE 6

A 0.5 gram portion of 4-epi-tetracycline [J.A.C.S. 79, 2849 (1957)] is dissolved in 10 milliliters of acetic acid, 2 milliliters of water, and 0.05 milliliter of perchloric acid. To this solution is added 2.0 grams of 5% rhodium on aluminum oxide (alumina). The resulting mixture is contacted with an excess of hydrogen at a pressure of 30 pounds per square inch for three hours and then filtered. Spectrophotometric and paper chromatographic analyses show the presence of 6-deoxy-4-epi-tetracycline in the filtrate.

EXAMPLE 7

The procedure of Example 6 is repeated except that a 0.5 gram portion of 7-chloro-4-epi-tetracycline [J.A.C.S. 79, 2849 (1957)] is used as the starting material. The compound is contacted with an excess of hydrogen in the presence of rhodium as described in Example 6. Spectrophotometric and paper chromatographic analyses show the presence of 6-deoxy-4-epi-tetracycline.

EXAMPLE 8

The procedure of Example 6 is followed except that a 0.5 gram portion of 7-bromo-4-epi-tetracycline [J.A.C.S. 79, 2849 (1957)] is used as the starting material. This compound is contacted with hydrogen as specified in Example 6. Spectrophotometric and paper chromatographic analyses show the presence of 6-deoxy-4-epi-tetracycline.

EXAMPLE 9

The procedure of Example 6 is followed except that 5-hydroxy-4-epi-tetracycline [J.A.C.S. 79, 2849 (1957)] is used as the starting material. This compound is contacted with hydrogen as described in Example 6 and thereafter filtered. Spectrophotometric and paper chromatographic analyses show the presence of 5-hydroxy-6-deoxy-4-epi-tetracycline.

EXAMPLE 10

The procedure of Example 5 is followed substituting 7-chlorotetracycline hydrochloride as the starting material. The hydrogenolysis is carried out as described in Example 5 and 6-deoxytetracycline is produced.

EXAMPLE 11

The procedure of Example 5 is followed substituting 7-bromotetracycline as the starting material. The hydrogenolysis is carried out as described in Example 5 and 6-deoxytetracycline is produced.

EXAMPLE 12

To 250 milliliters of a solvent solution prepared by mixing 125 milliliters of dimethylformamide and 125 milliliters of water are added 10 grams of 7-chlorotetracycline, 5 grams of activated charcoal and 5 grams of rhodium chloride. The mixture is contacted with hydrogen at 40 pounds pressure by shaking for four hours. The mixture is filtered and the filtrate is shown to contain each of 7-chloro-6-deoxytetracycline, 6-deoxytetracycline, tetracycline and 7-chlorotetracycline. The mixture is separated by preparative paper chromatography to yield pure 7-chloro-6-deoxytetracycline.

EXAMPLE 13

Example 12 is repeated, substituting 7-bromotetracycline for 7-chlorotetracycline. A mixture containing the expected 7-bromo-6-deoxytetracycline is produced. 7-bromo-6-deoxytetracycline is separated by preparative paper chromatography.

EXAMPLE 14

A 5.18 milligram portion of 6-demethyl-4-epi-tetracycline [J.A.C.S. 79, 4561 (1957)] is dissolved in 4 milliliters of a 1:1 mixture of dimethylformamide and water. To this solution is added 10.54 milligrams of 5% rhodium on carbon. The resulting mixture is contacted with an excess of hydrogen for 5½ hours and then filtered. Spectrophotometric and paper chromatographic analyses show the presence of 6-demethyl-6-deoxy-4-epi-tetracycline in the filtrate.

EXAMPLE 15

A 5.18 milligram portion of 7-chloro-6-demethyl-4-epi-tetracycline [J.A.C.S. 79, 4561 (1957)] is dissolved in 4 milliliters of a 1:1 mixture of dimethylformamide and water. To this solution is added 10.54 milligrams of 5% rhodium on carbon. The resulting mixture is contacted with an excess of hydrogen for 5½ hours and then filtered. Spectrophotometric and paper chromatographic analyses show the presence of 6-demethyl-6-deoxy-4-epi-tetracycline in the filtrate.

EXAMPLE 16

A 0.5 gram portion of 5-hydroxytetracycline hydrochloride is dissolved in 12 milliliters of a 1:1 mixture of dimethylformamide and water. To this solution is added 1.0 gram of 5% rhodium on carbon. The resulting mixture is contacted with an excess of hydrogen at a pressure of 30 pounds per square inch for 16½ hours and then filtered. Spectrophotometric assay of this filtrate shows a 32% yield of 5-hydroxy-6-deoxytetracycline hydrochloride.

EXAMPLE 17

A 0.5 gram portion of 6-demethyltetracycline neutral [J.A.C.S. 79, 4561 (1957)] is dissolved in 12 milliliters of a 1:1 mixture of dimethylformamide and water. The pH is adjusted to 2.2 with concentrated hydrochloric acid. To this solution is added 1.0 gram of 5% rhodium on carbon. The resulting mixture is contacted with an excess of hydrogen at a pressure of 30 pounds per square inch for 16 hours and then filtered. Spectophotometric assay of this filtrate shows a 26% yield of 6-demethyl-6-deoxytetracycline hydrochloride. Paper chromatography reveals no residual 6-demethyltetracycline hydrochloride.

EXAMPLE 18

*Preparation of 7-chloro-6-demethyl-6-deoxytetracycline*

To 250 milliliters of a 1:1 mixture of dimethylformamide and water there is added 10 grams 7-chloro-6-demethyltetracycline [J.A.C.S. 79, 4561 (1957)] and 7 grams of 40% rhodium-on-carbon hydrogenation catalyst. The mixture is contacted with hydrogen at 30 pounds pressure for 3 hours and then filtered. The filtrate is evaporated to a syrup and the syrup taken up in water and freeze-dried. The freeze-dried solid is dissolved in 25 milliliters water, the solution saturated with sodium chloride, and extracted with butanol. The butanol extracts are charged to a 6″ chromatographic column packed with diatomaceous earth and wet with 0.01 N aqueous hydrochloric acid. The column is developed with 20:80 chloroform:n-butanol which is shaken with an equal volume of 0.01 N hydrochloric acid and the eluate is collected in fractions. The fractions are assayed by paper chromatography and those fractions that contain 7-chloro-6-demethyl-6-deoxytetracycline are combined. The 7-chloro-6-demethyl-6-deoxytetracycline is isolated by concentration and crystallization and its identity shown by catalytic hydrogenolysis in alkaline ethylene glycol-monoethyl ether to form 6-demethyl-6-deoxytetracycline and chloride ion.

EXAMPLE 19

*Preparation of 7-bromo-6-demethyl-6-deoxytetracycline*

Example 18 is repeated substituting 7-bromo-6-demethyltetracycline for 7-chloro-6-demethyltetracycline. The product is 7-bromo-6-demethyl-6-deoxytetracycline.

EXAMPLE 20

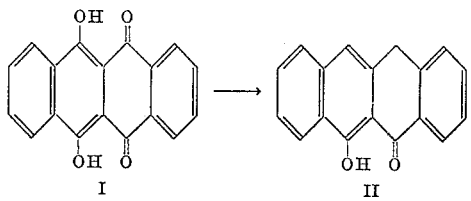

A 100 milligram portion of I (6,11-dihydroxy-5,12-dioxynaphthacene) is dissolved in 6 milliliters of dimethylformamide. A 400 milligram portion of 5% rhodium-on-carbon catalyst and 0.01 milliliter of concentrated hydrochloric acid are added and the hydrogen gas pressure is adjusted to 30 p.s.i. Reduction is carried out for 16 hours, with agitation, at room temperature (25°±5° C.). The catalyst is removed by centrifugation and the filtrate shows by paper chromatography the presence of II (11-hydroxy-12-oxynaphthacene).

This application is a continuation-in-part of our co-pending application Serial No. 694,483, filed November 5, 1957, now abandoned.

We claim:

1. A process for the catalytic reduction of 6-hydroxy hydronaphthacenes so as to form the corresponding 6-deoxy derivative thereof which comprises reducing a polar solvent solution of a 6-hydroxy hydronaphthacene with hydrogen in the presence of a finely-divided rhodium catalyst until about one mole of hydrogen has been absorbed for each mole of starting material used, and recovering the 6-deoxy derivative so formed.

2. A process of removing the 6-hydroxyl group from a compound having the tetracycline nucleus which comprises reducing a polar solvent solution of a compound having the tetracycline nucleus with hydrogen in the presence of a finely-divided rhodium catalyst until about one mole of hydrogen has been absorbed for each mole of starting material used, and recovering the 6-deoxytetracycline compound so formed.

3. A process of preparing a 6-deoxytetracycline which comprises reducing a polar solvent solution of a tetracycline antibiotic selected from the group consisting of tetracycline, 7-chlorotetracycline, 7-bromotetracycline, 5-hydroxytetracycline, 6-demethyltetracycline, 7-chloro-6-demethyltetracycline and 7-bromo-6-demethyltetracycline with hydrogen in the presence of a finely-divided rhodium catalyst until about two moles of hydrogen have been absorbed for each mole of starting material used when the starting material is a member of the group consisting of 7-chlorotetracycline, 7-bromotetracycline, 7-chloro-6-demethyltetracycline and 7-bromo-6-demethyltetracycline and until about one mole of hydrogen has been absorbed for each mole of starting material used when the starting material is a member of the group consisting of tetracycline, 5-hydroxytetracycline and 6-demethyltetracycline, and recovering the 6-deoxytetracycline so formed.

4. A process of preparing 6-deoxytetracycline which comprises reducing a polar solvent solution of a tetracycline antibiotic selected from the group consisting of tetracycline, 7-chlorotetracycline and 7-bromotetracycline with hydrogen in the presence of a finely-divided rhodium catalyst until about two moles of hydrogen have been absorbed for each mole of starting material used when the starting material is a member of the group consisting of 7-chlorotetracycline and 7-bromotetracycline and until about one mole of hydrogen has been absorbed for each mole of starting material used when the starting material is tetracycline, and recovering the 6-deoxytetracycline so formed.

5. A process of preparing 5-hydroxy-6-deoxytetracycline which comprises reducing a polar solvent solution of 5-hydroxytetracycline with hydrogen in the presence of a finely-divided rhodium catalyst until approximately one mole of hydrogen has been absorbed for each mole of 5-hydroxytetracycline, and recovering the 5-hydroxy-6-deoxytetracycline so formed.

6. A process of preparing 6-demethyl-6-deoxytetracycline which comprises reducing a polar solvent solution of a tetracycline antibiotic selected from the group consisting of 6-demethyltetracycline and 7-chloro-6-demethyltetracycline with hydrogen in the presence of a finely-divided rhodium catalyst until about two moles of hydrogen have been absorbed for each mole of starting material used when the starting material is 7-chloro-6-demethyltetracycline and until about one mole of hydrogen has been absorbed for each mole of starting material used when the starting material is 6-demethyltetracycline, and recovering the 6-demethyl-6-deoxytetracycline so formed.

7. A method of preparing 7-chloro-6-deoxytetracycline which comprises reducing a polar solvent solution of 7-chlorotetracycline with hydrogen in the presence of a finely-diveded rhodium catalyst until about one mole of hydrogen has been absorbed, and recovering the 7-chloro-6-deoxytetracycline so formed.

8. A method of preparing 7-chloro-6-demethyl-6-deoxytetracycline which comprises reducing a polar solvent solution of 7-chloro-6-demethyltetracycline with hydrogen in the presence of a finely-divided rhodium catalyst until about one mole of hydrogen has been absorbed, and recovering the 7-chloro-6-demethyl-6-deoxytetracycline so formed.

References Cited in the file of this patent

UNITED STATES PATENTS

| | | |
|---|---|---|
| 2,731,497 | McCormick et al. | Jan. 17, 1956 |

FOREIGN PATENTS

| | | |
|---|---|---|
| 167,750 | Australia | May 25, 1956 |